US006660224B2

(12) United States Patent
Lefebvre et al.

(10) Patent No.: US 6,660,224 B2
(45) Date of Patent: Dec. 9, 2003

(54) METHOD OF MAKING OPEN CELL MATERIAL

(75) Inventors: Louis-Philippe Lefebvre, Montreal (CA); Yannig Thomas, Montreal (CA)

(73) Assignee: National Research Council of Canada, Ottawa (CA)

(*) Notice: Subject to any disclaimer, the term of this patent is extended or adjusted under 35 U.S.C. 154(b) by 0 days.

(21) Appl. No.: 09/938,638

(22) Filed: Aug. 27, 2001

(65) Prior Publication Data

US 2003/0044301 A1 Mar. 6, 2003

(51) Int. Cl.⁷ ................................................ B22F 3/10
(52) U.S. Cl. ............................. 419/2; 264/628; 75/252
(58) Field of Search .............................. 419/2; 75/252; 264/628

(56) References Cited

U.S. PATENT DOCUMENTS

| | | | |
|---|---|---|---|
| 3,078,552 A | 2/1963 | Grandey | |
| 3,087,807 A | 4/1963 | Allen et al. ................... | 75/415 |
| 3,794,481 A | 2/1974 | Niebylski et al. ............. | 75/2 F |
| 3,796,565 A | 3/1974 | Hancock et al. ............... | 419/23 |
| 3,833,386 A | 9/1974 | Wood et al. ................... | 501/82 |
| 3,897,221 A * | 7/1975 | Salyer ......................... | 29/191.2 |
| 3,946,039 A * | 3/1976 | Walz ........................... | 264/332 |
| 4,225,346 A | 9/1980 | Helliker et al. ................ | 419/2 |
| 4,251,603 A | 2/1981 | Matsumoto et al. ........... | 429/94 |
| 4,430,294 A | 2/1984 | Tracey ......................... | 419/2 |
| 4,569,821 A | 2/1986 | Duperray et al. .............. | 419/2 |
| 4,713,277 A | 12/1987 | Akiyama et al. ............. | 428/131 |
| 4,775,598 A | 10/1988 | Jaeckel ....................... | 428/550 |
| 4,957,543 A | 9/1990 | Babjak et al. ................. | 148/525 |
| 4,973,358 A | 11/1990 | Jin et al. ...................... | 75/415 |
| 5,112,696 A | 5/1992 | Roberts ....................... | 428/516 |
| 5,132,080 A | 7/1992 | Pfeil ........................... | 419/2 |
| 5,151,246 A * | 9/1992 | Baumeister et al. ........... | 419/2 |
| 5,181,549 A | 1/1993 | Shapovalov ................... | 164/79 |
| 5,213,612 A | 5/1993 | Minnear et al. ............... | 75/415 |

(List continued on next page.)

FOREIGN PATENT DOCUMENTS

| | | | |
|---|---|---|---|
| DE | 1 483 702 | 3/1969 | |
| EP | 210803 | 9/1989 | |
| EP | 0 799 810 | 10/1997 | |
| FR | 1307084 | 9/1962 | |
| FR | 1573864 | 6/1969 | |
| GB | 1501115 | 2/1978 | |
| JP | 05-6763 | 1/1993 | |
| WO | 91/01387 | 2/1991 | ............. C22C/1/08 |
| WO | 91/03578 | 3/1991 | |
| WO | 91/19823 | 12/1991 | |
| WO | 92/03583 | 3/1992 | |
| WO | 92/21457 | 12/1992 | |
| WO | 94/09931 | 5/1994 | |
| WO | 94/17218 | 8/1994 | |
| WO | 01/05542 | 1/2001 | |

OTHER PUBLICATIONS

D.S. Schwartz et al.; Porous and Cellular Materials for Structural Applications; Materials Research Society Symposium Proceedings; vol. 521; Materials Research Society Editor; Apr. 13–15, 1998; San Francisco.

J. Banhart and H. Eifert, Metal Foams, Fraunhofer USA Metal Foam Symposium, Stanton Editor; Oct. 7–8, 1998; Delaware.

(List continued on next page.)

Primary Examiner—Daniel J. Jenkins
(74) Attorney, Agent, or Firm—Marks & Clerk

(57) ABSTRACT

The porous material of the present invention is produced by heating a dry powder mixture, containing mainly an organic solid binder and inorganic particles. The mixture is foamed while the organic binder is melted. Foaming comes from a foaming agent in the powder mixture. The solid foamed structure comprising inorganic particles embedded in an organic binder is then heated to eliminate the organic binder and finally to sinter the remaining inorganic tri-dimensional network into a rigid structure having interconnected porosity.

40 Claims, 3 Drawing Sheets

U.S. PATENT DOCUMENTS

| | | | |
|---|---|---|---|
| 5,296,261 A | | 3/1994 | Bouet et al. ................. 427/123 |
| 5,393,485 A | * | 2/1995 | Worz et al. .................... 419/41 |
| 5,640,669 A | | 6/1997 | Harada et al. .............. 428/552 |
| 5,759,400 A | | 6/1998 | Fanning ................... 210/510.1 |
| 5,848,351 A | | 12/1998 | Hoshino et al. ............ 428/550 |
| 5,865,237 A | | 2/1999 | Schorghuher et al. ........ 164/79 |
| 5,881,353 A | | 3/1999 | Kamigata et al. .............. 419/2 |
| 5,930,580 A | * | 7/1999 | Everett .......................... 419/2 |
| 5,972,285 A | * | 10/1999 | Knott ............................ 419/2 |
| 5,976,454 A | * | 11/1999 | Sterzel et al. .................. 419/2 |
| 6,094,798 A | * | 8/2000 | Seeliger et al. .............. 29/469 |
| 6,171,532 B1 | | 1/2001 | Sterzel ........................ 264/43 |

OTHER PUBLICATIONS

Soria R.; Overview on Industrial Membranes; Catalyst Today, 25, pp. 285–290 (1995).

Kaptsevich V.M. et al.; Influence of the Morphology of the Original Powder on the Properties of Porous Materials, Sov. Powder Metall. Met. Ceram., 29 (4), pp. 308–313 (1990).

Solaiyan et al.; Preparation and Characterization of Porous Electrodes from Nickel Powder for Fuels Cells; Indian J. of Chemical Technology, 6, pp. 48–54 (1999).

Paruthimal et al.; Analysis of Porous Iron Electrodes by Scanning Electron Microscopy, B. Electrochem., 5(2), pp. 99–105 (1986).

Stiller C. et al.; Manufacturing and Characterization of Low Density Titanium Parts, Proc. Of 1998 Powder Metallurgy World Congress & Exhibition, Granada, Spain, Edited by EPMA, vol. 5, pp. 189–194.

* cited by examiner

METHOD OF MAKING OPEN CELL MATERIAL

BACKGROUND OF THE INVENTION

1. Field of the Invention

This invention relates to the field of porous materials, and in particular to a method of making an open cell metal or ceramic material.

2. Description of Related Art

Porous metal or ceramic materials are currently used for the fabrication of devices such as filters, heat exchangers, sound absorbers, electrochemical cathodes, fuel cells, catalyst supports, fluid treatment units, lightweight structures and biomaterials. The structures (open/closed porosity, pore size distribution and shape, density) and properties (permeability, thermal, electrochemical and mechanical properties) required greatly depend on the application. Closed porosity is generally sought for lightweight structure while open porosity is particularly sought when surface exchange are involved or when permeability or pore connectivity is required.

Different approaches have been proposed for the fabrication of such porous materials. Good reviews of manufacturing methods and characterization of porous metal or ceramic material are given in Porous and Cellular Materials for Structural Applications, Materials Research Society Symposium Proceedings Vol. 521, Apr. 13–15, 1998, San Francisco, D.S. Schwartz et al. Ed., Materials Research Society; Metal Foams, Fraunhofer USA Metal Foam Symposium, J. Banhart and H. Eifert, ed. Stanton, Delaware, Oct. 7–8, 1998, and R. Soria, "Overview on Industrial Membranes", Catalysis Today, 25, pp. 285–290 (1995).

Deposition techniques have been used for the fabrication of metal foam. U.S. Pat. No. 4,251,603 and Japanese Patent Laid-Open Patent Application No. 5-6763 describe processes consisting of plating a sponge-like resin and then burning the resin to obtain a metal foam. Deposition may also be done from salts (U.S. Pat. No. 5,296,261) or gas (U.S. Pat. No. 4,957,543). Those processes provide low-density materials having open-cell porosity.

Direct foaming of melts is described in various patents, for example, U.S. Pat. Nos. 3,794,481; 4,713,277; 4,973,358; 5,112,696 and WIPO publications Nos. WO 91/03578, WO 92/03583, WO 94/172218, WO 91/01387, WO 91/19823, WO 94/09931, WO 92/21457, European Pat. No. 0 210803 and Norwegian Pat. PCT/NO90/00115. In techniques described in these patents, foaming is carried out by blowing gases in the melt or adding chemical foaming agents such as titanium hydride which release gas when heated and creates bubble in the melt. Melt viscosity is generally adjusted using additives such as silicon carbide, aluminum oxide, magnesium oxide or calcium. These processes provide foams with good mechanical properties. The resulting foams have closed porosity.

An alternative approach to produce metal foams from liquid metals is the solid-gas eutectic solidification (Gasars) method such as described in U.S. Pat. No. 5,181,549. The method utilizes an enclosed vessel in which a base material is melted. A gas, whose solubility in the base material decreases with decreasing temperature and increases with increasing pressure, is dissolved into the base material. The metal is then cooled at a predetermined pressure to precipitate the gas and form pores in the solidified material.

Investment casting is also known for the fabrication of metal foams. A polymer foam having open pores is filled with a slurry of heat resistant material. The impregnated foam is then dried and heated at moderate temperature to eliminate the polymer. The resulting heat resistant porous structure is then impregnated with a liquid metal. After solidification, the mold is removed using pressurized water. The final metal foam has the original polymer foam structure. The material has good mechanical properties and large interconnected porosity.

Powder metallurgy has also been extensively used to produce porous materials using different approaches. Some techniques use a combination of solid and liquid state processing to produce metal foam from powders. U.S. Pat. No. 3,087,807 by B. C. Allen, M. C. Mote and A. M. Sabroff describes a method to produce lightweight, porous metal structure comprising the step of compacting a mixture containing aluminum powder and a foaming agent, selected from the group consisting of calcium carbonate, zirconium hydride and titanium hydride, which releases a substantial amount of gas at about the melting temperature of aluminum, extruding the resulting compact below the melting point of aluminum to form a rod, progressively heating the extruded rod to at least the melting temperature of aluminum to produce a foam, and rapidly cooling the resulting foamed material to form a lightweight porous structure having a uniform close cell porosity and density of about 0.45 to 0.58 g/cm$^3$.

A modified approach, described in U.S. Pat. No. 5,151,246 by J. Baumeister and H. Schrader, consists of manufacturing foamable metal bodies in which a metal powder and a foaming agent powder is hot-compacted to a semi-finished product at a temperature at which the joining of the metal powder particles takes place primarily by diffusion and at a pressure which is sufficiently high to hinder the decomposition of the foaming agent in such fashion that the metal particles form a solid bond with one another and constitute a gas-tight seal for the gas particles of the foaming agent. The foamable metal body can also be produced by rolling.

An approach described in U.S. Pat. No. 5,865,237 by F. Schorghuber, F. Simancik and E. Hartl involves providing compacts of a powder of a metal to be foamed and a gas-evolving foaming agent; heating a volume of said compacts in a heatable chamber communicating with a mold having a mold cavity of a shape complementary to the casting to be made which, upon complete foaming, corresponds at least to the volume of said mold cavity, the heating of said compacts being sufficient to at least partially foam the metal of said powder; while said metal of said powder is being foamed in said chamber, forcing the entire contents of said chamber, formed by foaming of said compacts, into said mold cavity; and permitting residual foaming of said contents in said cavity to distribute the foaming metal to all parts of said cavity and produce a foamed metal body conforming completely to said cavity.

Techniques involving the deposition of powders on polymer medium (foams or granules) have also been developed. Those techniques consist in depositing metal or ceramic particles on a polymer and burning the polymer to obtain porous metal or ceramic materials. U.S. Pat. No. 5,640,669 by K. Harada, M. Ishii, K. Watanabe and S. Yamanaka describes a process for preparing a metal porous body having a three-dimensional network structure by depositing a layer comprising Cu, a Cu alloy, or a precursor thereof on a skeleton composed of a porous resin body having a three-dimensional network; heat-treating the resin body with the layer formed thereon to remove the heat-decomposable organic component, thereby forming a porous metal skeleton of Cu or a Cu alloy. U.S. Pat. No. 5,759,400 by C. E. Fanning describes the fabrication of metal foams by cutting a polyethylene foam to form a substrate having a desired size and shape, submerging the polyethylene substrate into a solvent for a period of time effective to provide a substrate with a tacky surface, coating the tacky surface of the polyethylene with a slurry of copper powders admixed with a binder, drying the impregnated polyethylene foam, burning the polyethylene in a furnace to produce a foam structure consisting of copper and sintering the final product to obtain a rigid structure.

U.S. Pat. No. 5,881,353 by Y. Kamigata, T. Yoshida, K. Susa, T. Uchida and H. Hiratsuka discloses a method for producing a porous body with high porosity by coating a resin foam, such as urethane foam, with an adhesive to impart stickiness to the surface of the foam, and thereafter a powder such as copper oxide powder is applied thereto, followed by heating to remove the substrate and sinter the powder. Thus, a porous body to which the pattern of the base material has been transferred is produced. The powder may be appropriately selected to obtain porous bodies having a great strength, without limitations on materials.

Methods for preparing porous hollow spheres and sponge-like particles are described in U.S. Pat. No. 4,775,598 by M. Jaeckel. Such porous hollow spheres could be used to produce porous materials. The process for making hollow spherical particles, comprising the steps of providing metallized lightweight spherical bodies from cores of a foamed polymer with a metal coating of a thickness of 5 to 20 microns; coating said metallized lightweight spherical bodies with a dispersion of at least one particulate material selected from the group which consists of metals, metal oxides, ceramics and refractories to a dispersion coating thickness of 15 to 500 microns; drying the dispersion coating on said metallized lightweight spherical bodies to form a dry layer of said material thereon; heating said metallized lightweight spherical bodies with said dry layer of said material thereon to a temperature of about 400° C. to pyrolyze said polymer cores and form hollow bodies essentially consisting of said metal coatings and said dry layers of said material thereon; and subjecting said hollow bodies essentially consisting of said metal coatings and said dry layers of said material thereon to a sintering temperature of 900° C. to 1400° C. for a period sufficient to sinter the material of the respective layer and the respective layer to the respective metallic coating, thereby forming hollow spherical particles.

Sintering of freely poured powder, as described in V. M. Kaptsevich et al. "Influence of the Morphology of the Original Powder on the Properties of Porous Materials", *Sov. Powder Metall. Met. Ceram.*, 29 (4), pp. 308–313 (1990), or in G. Paruthimal et al. "Analysis of Porous Iron Electrodes by Scanning Electron Microscopy", *B. Electrochem.*, 5 (2), pp. 99–105 (1986), has also been used to produce components having high porosity. Powder mixtures may or may not contain additives such as pore formers or foaming agents. C. Solaiyan et al., "Preparation and Characterization of Porous Electrodes from Nickel Powder for Fuel Cells", *Indian J. of Chemical Technology*, 6, pp.48–54 (1999), describe processes for the preparation of porous electrodes by compacting layers of mixture composed of nickel particles admixed with 5–20 wt. % pore formers elements such as $Na_2CO_3$, KCl, $NH_4HCO_3$ and naphthalene. C. Stiller et al., "Manufacturing and Characterization of Low Density Titanium Parts", Proc. of 1998 Powder Metallurgy World Congress & Exhibition, Granada, Spain, Ed. by EPMA, Vol.5, pp. 189–194, describe a process for manufacturing porous titanium parts by compacting a mixture of titanium powder with a space holder material (carbamide). Materials produced using those techniques have open porosity. Depending on the powder used, fine pore size distribution may be obtained. However, structures with very low density are more difficult to produce.

Slurries have also been extensively used to produce porous materials. The slurries contain metal or ceramic particles, a liquid medium and optionally surface-active agents, binders, gelling agents, stabilizing agents and foaming agents. Optionally, gas may be injected in the slurry. Slurries are cast or poured in a mould. The resulting product is dried at moderate temperature, debinded and sintered to provide strength.

U.S. Pat. No. 5,132,080 by L. B. Pfeil describes an horizontal process for the production of a continuous porous metal strip which comprises forming a slurry of metal powders in a liquid medium, depositing said slurry via leveling means on a flat horizontal moving surface in a slurry layer of uniform thickness, immediately thereafter horizontally passing said slurry layer through an evaporating zone, a calender zone, and then through a sintering zone whereby the liquid medium is substantially removed and cohesion between the metal particles is subsequently obtained, and thereafter continuously separating the cohesive porous strip thus formed from the moving surface.

U.S. Pat. No. 4,430,294 by V. A. Tracey describes a slurry process for the production of porous nickel bodies characterized by high strength, residual carbon content below about 0.08 wt. %, and a porosity exceeding 75 v %, the process consisting essentially of providing a carbonyl nickel powder, forming a nickel-carbon mixture by adding carbon particles to the nickel powder in an amount sufficient to raise the carbon content thereof to about 0.35–2 wt. % carbon, the particle size of the carbon no greater than the particle size of the nickel powder, forming a green body from the mixture, sintering the body in a reducing atmosphere, the temperature of the reducing atmosphere between 750° C. and 1050° C., the reducing atmosphere consisting essentially of hydrogen, nitrogen and 15–30 v % carbonaceous gas, for the time necessary to maintain the porosity of the body above 75 v %. The specimens prepared in the examples were fabricated in aqueous solution of methyl cellulose containing a defoaming agent.

U.S. Pat. No. 3,796,565 by H. A. Hancock and D. J. I. Evans describes a process for making a porous nickel plate including the steps of providing a starting material composed of nickel powder; adjusting the content of nickel oxide in said starting material to about 0.7 to about 1.4 percent by weight; dispersing the so-adjusted starting material in a volatile liquid to form a slurry; heating the slurry to a temperature below sintering temperature but sufficient to evaporate the volatile liquid fraction thereof; and sintering said heated slurry in a reducing atmosphere.

U.S. Pat. No. 4,225,346 by C. D. Helliker and T. D. O'Sullivan describes a process for making porous nickel bodies of various shapes by forming, debinding and sintering a gel mixture, the gel mixture being prepared by mixing together an aqueous solution of modified cellulose ether which gels on heating and a metal powder consisting essentially of nickel and heating this mixture to a temperature between 50 and 120° C. in order to achieve gelling.

U.S. Pat. No. 3,897,221 by I. O. Salyer and R. T. Jefferson discloses a method for preparing porous metal structures by forming a polyurethane structure containing powdered metal, said structure being formed by mixing metal powder in a solution containing the polyurethane forming reactants, polymerizing the mixture in place without stirring after onset of gelation; removing the polyurethane, preferably by heating in air at a temperature below the sintering temperature of the metal, and sintering the remaining porous metal or metal oxide structure.

U.S. Pat. No. 4,569,821 by G. Duperray and M. Hilaire discloses a method for preparing a porous metal body, the method comprising the steps of adding a surface active agent and a gelling agent to water; agitating the mixture to produce a foam; incorporating metal powder into the foam to obtain a suspension of the metal in the foam; adding a stabilizing agent to the foam, stabilizing agent being a material that polymerizes upon contact with water; shaping the stabilized foam suspension; allowing the shaped and stabilized foam suspension to set; and heating the set foam to a temperature high enough to burn the organic material therein and to sinter the suspended metal powder.

U.S. Pat. No. 5,848,351 by K. Hoshino, Y. Mayuzumi, T. Kohno and N. Komada discloses a porous metallic material produced by preparing a foamable slurry containing for example a metal powder, a water-soluble resin binder, a water insoluble hydrocarbon organic solvent (foaming agent), a surfactant and water, forming the foamable slurry, drying the formed product, preferably after foaming, and finally heating the dry formed product to eliminate the resin binder and sinter the material. The obtained material has a low-density three-dimensional network structure, which is composed entirely of a sintered metal powder. The resulting material has high specific surface area.

U.S. Pat. No. 3,833,386 by L. L. Wood, P. Messina and K. C. Frisch discloses a method for the preparation of ceramic foam structures prepared by reacting an isocyanate-capped polyoxyethylene polyol reactant with large amount of an aqueous reactant containing finely divided sinterable ceramic material. The resultant foams having the sinterable ceramic material dispersed thereon are heat-treated under firing conditions to decompose the carrier foam and sinter the ceramic particles. The resulting material is a rigid ceramic foam structure.

U.S. Pat. No. 5,213,612 by W. Minnear and B. P. Bewlay discloses a method for forming a porous body of a metal from the group consisting of molybdenum, molybdenum alloys tungsten, tungsten alloys or mixtures thereof comprising the foaming of an aqueous slurry of a sinterable metal powder and a foaming agent in a volume ratio of about 0.6 to 3.5:1 respectively, to form a foam having the metal powder dispersed therein; drying and heating the foam to decompose the foam and sinter the metal powder in a reducing atmosphere to promote interparticle diffusion and bonding.

French patent No. 1,573,864 discloses a method of making a foam or cellular structure. The process described in this patent employs two different types of agent: foaming agents and spacing agents. The effects of these two agents are quite different. Foaming agents create a gaseous volume expansion to create a foam within a liquid. Spacing agents provide bulk, which is subsequently removed to leave voids where the spacing agents were present.

In the first eight examples of the French patent, foaming agents are employed to create a foam from a slurry containing an inorganic powder, a liquid resin and a foaming agent. Example 9 of the French patent discloses a process for making a porous structure wherein a silicium powder is mixed with a liquid binder. The resulting mixture is reduced to powder, mixed with camphor and then compacted into blocks. The camphor is then vaporized to remove it from the blocks and leave voids in its place. In this case the camphor acts purely as a spacing agent since it merely creates bulk, which is removed to create the voids between the particles and no foaming occurs.

SUMMARY OF THE INVENTION

It has been found surprisingly that open cell materials with unique microstructure can be obtained by using a dry powder mixture. Such as mixture can be made easily flowable. Generally, it would be thought that a powder would not be suitable for foaming because the released gases would tend to flow around the particles and escape without creating a foam.

Contrary to expectations it has been discovered that foaming can be made to occur starting from a powder mixture because during the thermal treatment the binder melts and flows around the particles, thereby closing the pores before foaming starts to occur.

Accordingly the present invention provides a method of making a porous body, comprising the steps of providing a dry flowable powder mixture comprising 10–90 wt. % of sinterable particles, 10–90 wt. % of binder, and 0.25–5 wt. % of foaming agent; shaping said flowable powder mixture into a predetermined form; heating the product to melt the binder while inducing foaming in the mixture; heating the foamed structure to pyrolyze said binder; and sintering the debinded material to form a solid low-density open-cell foam. Optionally, pressure may be applied to the powder mixture before or during the heating of the powder mixture.

The foaming agent may be a solid, but it can also be a liquid embedded or in solution in the binder, a gas in solution in the binder, or a mixture of two or more foaming such agents. As long as they are embedded or in solution in the binder, the final mixture will remain a dry flowable mixture.

The sinterable particles may be coated particles, metallic particles, ceramic particles, or a mixture of metallic, ceramic and/or coated particles.

Optionally, a cross-linking agent may be added to the dry powder mixture to cure the binder and improve the mechanical strength of the foamed structure before debinding.

Optionally, 0.01 wt. % to 5 wt. %, but preferably between 0.05 wt. % to 5 wt. % additional binder may be added to minimize segregation and dusting and improve the flowability of the dry powder mixture.

In accordance with the invention, the dry powder mixture is preferably heated in a stepwise fashion during the respective foaming, debinding and sintering processing steps. Heating rates and temperature plateaux depend on the powder composition, forming conditions, microstructure and properties required and the applications. Typically, the temperature used to melt the binder and foam the structure ranges from 40° C. to 300° C., but preferably lies between 75° C. and 200° C. Optionally, the heat treatment during the foaming steps may induce some consolidation of the binder by cross-linking if for instance thermoset binder or thermoplastic binder with cross-linking agent are used.

BRIEF DESCRIPTION OF THE DRAWINGS

The invention will now be described in more detail, by way of 3 examples only, with reference to the accompanying drawings, in which.

DETAILED DESCRIPTION OF THE PREFERRED EMBODIMENTS

Figure 1:
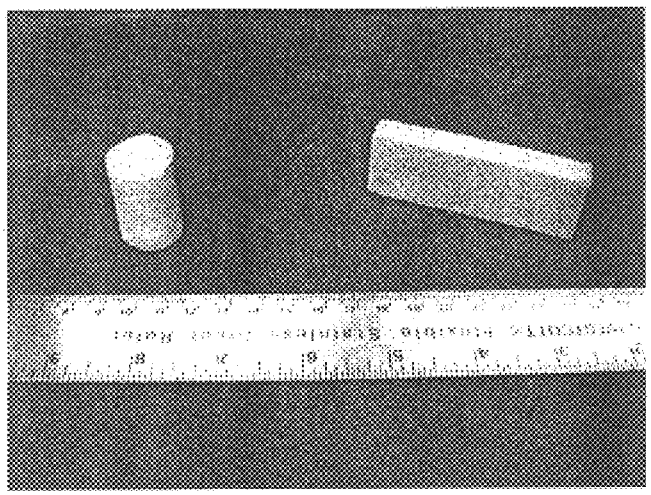
FIG. 1 shows typical metal foam specimens produced by a method in accordance with the invention.

The porous material of the present invention can be produced from a dry powder mixture comprising an inorganic powder, an organic solid binder and a foaming agent. The inorganic powder comprises metal or ceramic particles, coated particles or a mixture of metal, ceramic and/or coated particles. The inorganic powder content may vary from 10 to 90 wt. % of the total weight of the dry powder mixture (from 40 to 90 wt. % for metal particles or 10 to 60 wt. % for ceramic particles).

The organic solid binder in the dry powder mixture comprises a thermoplastic polymer or a thermoset resin or a mixture of thermoplastic polymer and thermoset resin, in an amount from about 10 to 90 wt. % based on the total weight of the dry powder mixture, preferably from 20 to 70 wt. %. The binder should have an adequate viscosity during foaming to promote material expansion during the process. Additionally, the binder should ideally have clean burn out characteristics. It must ideally not leave decomposition products that will affect negatively the properties or characteristics of the final product. However, some residues can be accepted if they have no impact on the final product or improve some of its properties or characteristics.

Optionally, the mixture may comprise a cross-linking agent that may induce curing of the binder during or after the foaming step, and by the way improve the mechanical strength of the foamed structure before debinding. Optionally, the mixture may also comprise other additives such as a lubricant to ease shaping, molding or demolding or flowing agents that improve the flowability of the powder.

The solid organic binder can be blended with the other constituents using various techniques including dry mixing, milling, mixing the binder in suspension or solution in a liquid, or blending the melted binder with the inorganic powders and the other additives. When the binder is added in suspension or solution, the liquid is removed by evaporation optionally with heat, under vacuum or with a combination of both heat and vacuum. When the binder is added in suspension, in solution or in the melted state, the resulting product may be inorganic particles coated with the binder, agglomerates of inorganic/binder particles or agglomerates of inorganic particles and/or the other additives embedded in the binder. Whatever, the mixing technique used, the resulting product is a dry powder mixture, which may or may not be agglomerated.

The dry powder mixture comprises also a foaming agent in an amount from about 0.25 to 5 wt. % based on the total weight of the dry powder mixture, preferably from 0.5 and 3 wt. %. The choice of the foaming agent is made such that gaseous species will be released in the temperature range where the binder is liquid or melted. Ideally, it must not leave decomposition products that may negatively affect the final properties of the foamed structure. However, some residues can be accepted if they have no impact on the final product or improve some of its properties.

Typically, the foaming agent is dry mixed in powder form with the other constituents of the mixture using state of the art techniques. The foaming agent may also be added in suspension or solution. The liquid is then removed by evaporation optionally with heat, under vacuum or with a combination of both heat and vacuum. The foaming agent may also be mixed in the melted state with the other constituents of the powder mixture. The foaming agent may also be incorporated in the binder in the solid, liquid or gaseous state. Whatever, the mixing technique and the choice of the foaming agent used, the resulting product is a dry powder mixture, which may or may not be agglomerated.

An additional binder between 0.01 wt. % to 5 wt. %, but preferably between 0.05 wt. % to 1 wt. %, may be used in the formulation. This additional binder is used to glue different constituents of the mixture together in such a way that the final product is less prone to segregation or dusting. This additional binder can also be used to improve the flowability of the mixture. The additional binder may be added at different steps of the mixing procedure, either before mixing the inorganic powder with the other constituents, after the binder addition, after the foaming agent addition, after the lubricant addition, after the flowing agent addition or after the addition of any combination of those constituents. Whatever, the mixing technique used, the resulting product is a dry powder mixture, which may or may not be agglomerated.

The resulting dry powder mixture may be shaped using methods such as molding, deposition or lamination. The product is then heated at a moderate temperature to melt the binder and foam the material. Optionally, pressure may be applied to the powder mixture before or during heating the powder mixture. The resulting foam porosity and structure depend on the particle size, shape, density and content of the inorganic powder; the content, distribution and viscosity of the binder; the content, distribution and vaporization or decomposition characteristics of the foaming agent, as well as the processing conditions.

Optionally, the mechanical strength of the foamed structure may be further increased, before debinding and sintering, by using externally assisted cross-linking techniques such as irradiation or light exposure.

After foaming and optionally cross-linking, the foam is treated at higher temperature to pyrolyze the binder. The atmosphere, duration and temperature of the thermal treatment must allow an adequate decomposition of the binder. Binder decomposition should not deteriorate the tridimensional structure of the foam. If gas pressure generated during binder decomposition is too important, cracking may occur in the non-sintered structure. Oxidizing or reducing conditions during the thermal treatments may be chosen to optimize binder decomposition and to control powder surface characteristics. After decomposition, the foam is composed of open cell metal or ceramic material.

Sintering is done after the debinding step to create interparticle bonds and provide the physical, electrical or mechanical properties to the foam. Sintering conditions (temperature, time and atmosphere) must be such that interparticle bonds are created while extensive densification is avoided. Sintering temperature greatly depends on the material. To avoid densification, the material is typically sintered at temperatures ranging from 30% to 90% of the melting temperature of the material, but preferably between 45 to 75% of the melting temperature. Sintering is generally done in reducing atmosphere for metal particles to promote the creation of good metallic bonds between the particles and to avoid the formation of surface oxides on the foam.

The final product has a low-density open cell structure. Porosity varies, typically between 50 and 95 vol. %, but preferably between 75 and 90 vol. %. The resulting product has three different levels of porosity. Large porosity may be attributed to the formation of the cells and their coalescence during foaming, intermediate porosity to the windows formed in the cell wall during foaming and to the decomposition of the binder during debinding, and fine microporosity to the porosity between the particles. Depending on the sintering temperature and duration, the fine microporosity may be more or less eliminated during sintering. Mechanical strength may be adjusted for the application. Fine particles, low binder content and high sintering temperature provide higher mechanical strength.

EXAMPLE 1

Ni foams were produced with the formulation presented in Table 1. The different constituents were dry-mixed together. After mixing, the powder was poured into a mold and foamed at 150° C. in air. After foaming, the material was submitted to the debinding step in a tube furnace at 500° C. for 4 h in a dry air stream. Finally, the specimens were sintered in Ar-10%$H_2$ for 2 h at 750° C.

TABLE 1

Formulation used for the fabrication of the Ni foams.

| Metallic Powder Ni powder | Binder Phenolic resin | Foaming agent P-toluene sulfonyl hydrazide |
|---|---|---|
| 70.18 wt. % | 29.32 wt. % | 0.5 wt. % |

FIG. 1 shows machined specimens obtained with the formulation of Table 1. The specimens were machined from plates and tubes after sintering. Table 2 shows that the density of the foamed material is significantly smaller than that of a material obtained by loose sintering without using binder and foaming agent. The density of the foam is almost 10 times smaller than that of pure solid nickel.

TABLE 2

Density of a Ni foam produced with the process compared to that of loose sintered Ni and bulk nickel

| Material | Density g.cm$^{-3}$ |
|---|---|
| Ni foam | 0.83 |
| Loose sintered powder | 2.82 |
| Bulk Ni | 8.9 |

Figure 2A:
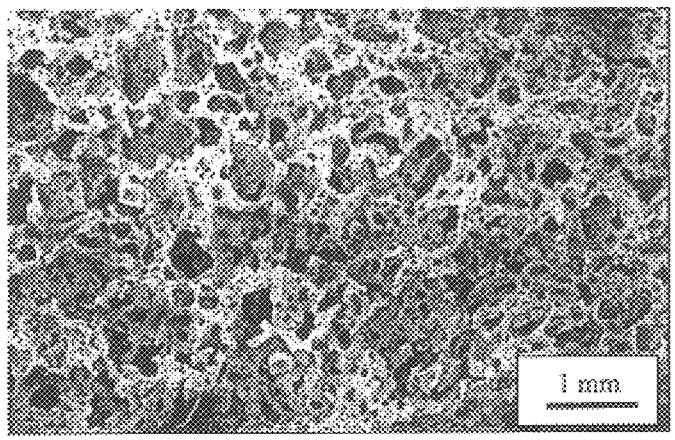
FIGS. 2a and 2b are SEM micrographs showing a) the structure of a Ni specimen foamed at 150° C. and sintered at 750° C. and b) a loose Ni powder sintered at 750° C. (without binder and foaming agents)
Figure 2B:
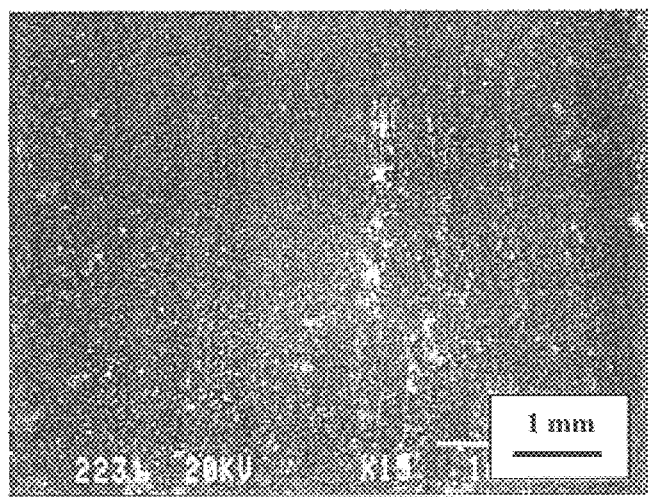

The microstructure of the foamed material is very different from that obtained only by sintering loose powder (FIG. 2). The foaming process described in this invention allows the creation of large pores that are not present in the loose sintered specimen. The structure of the foamed material is open and has three levels of porosity, the main cells, the window in the cell walls and the porosity between the metallic powders.

EXAMPLE 2

Figure 3A:
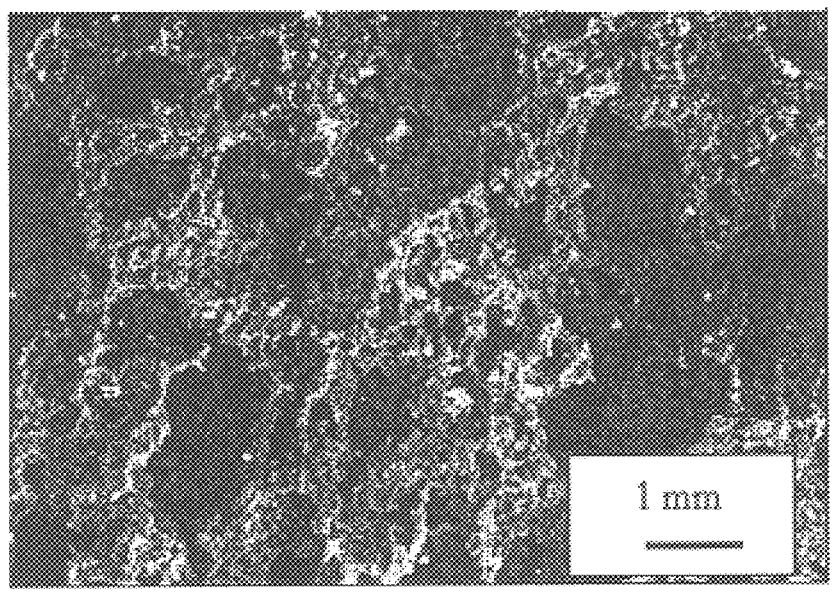
FIGS. 3a and 3b are SEM micrographs showing a) a Cu foam and b) a Fe foam produced with the formulation composition given in Table 2.
Figure 3B:
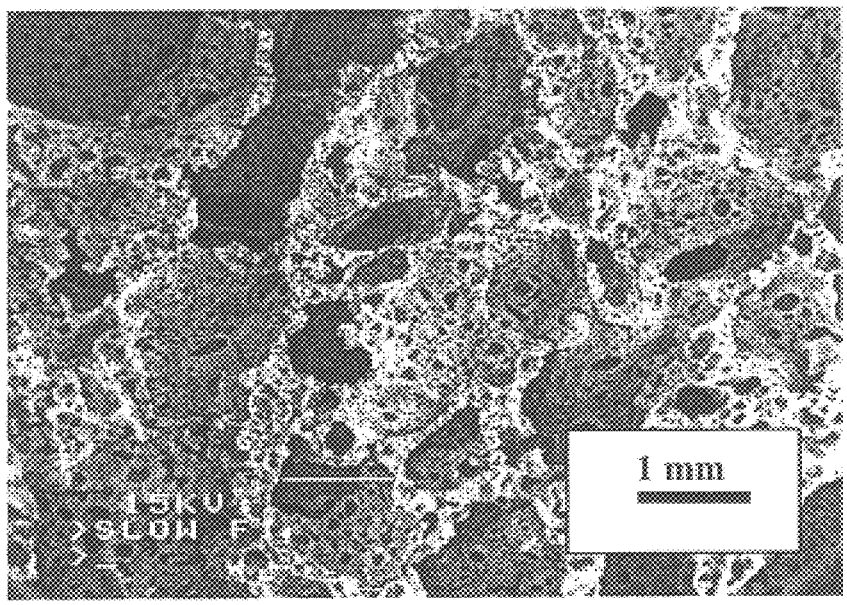

Foams were produced with the formulations presented in Table 3, using the procedure described in Example 1. Depending on the formulation, it is possible to produce different materials. The microstructure of copper and iron foams is presented in FIGS. 3a and 3b. It is also possible to modify the microstructure of the material by modifying the mixture composition. Another way to modify the structure and properties of the material is to modify the foaming process parameters. In fact, the microstructure of a material foamed at 190° C. with the formulation given in Table 1 is presented in FIG. 4. The pore size of the material foamed at 190° C. is significantly larger than that of the material foamed at 150° C. (FIG. 2a).

TABLE 3

Formulations used for the fabrication of different metallic foams of Example 2.

| Metallic Powder | Binder Phenolic resin | Foaming agent P-toluene sulfonyl hydrazide |
|---|---|---|
| 75 wt. % Ni | 24.25 wt. % | 0.75 wt. % |
| 70.18 wt. % Cu | 29.32 wt. % | 0.5 wt. % |
| 70.18 wt. % Fe | 29.32 wt. % | 0.5 wt. % |

EXAMPLE 3

Ni foams were produced with the formulation presented in Table 3 using a thermoplastic binder. The different constituents were dry-mixed together. After mixing, the powder mixture was poured into a mold, compressed to a density of 2.28 g/cm$^3$ and heated at 180° C. in air to melt the binder and induce the foaming. The foamed material was further submitted to the debinding step in a tube furnace at 500° C. for 4 h in a dry air stream. Finally, the specimens were sintered in Ar-10%$H_2$ for 2 h at 750° C.

TABLE 4

Formulation used for the fabrication of the Ni foams.

| Metallic Powder Ni powder | Binder Polyethylene powder | Foaming agent p,p'-oxybis (benzene sulfonyl hydrazide) |
|---|---|---|
| 79.5 wt. % | 18 wt. % | 2.5 wt. % |

Figure 4:
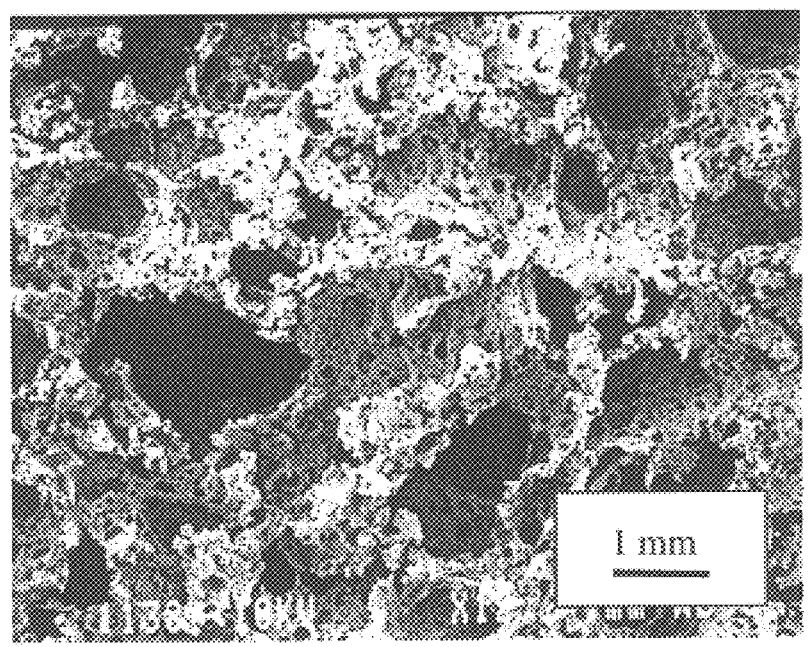
FIG. 4 is a SEM micrograph of a nickel foam structure produced by foaming at 190° C. the formulation composition given in Table 1 in accordance with the invention.
Figure 5:
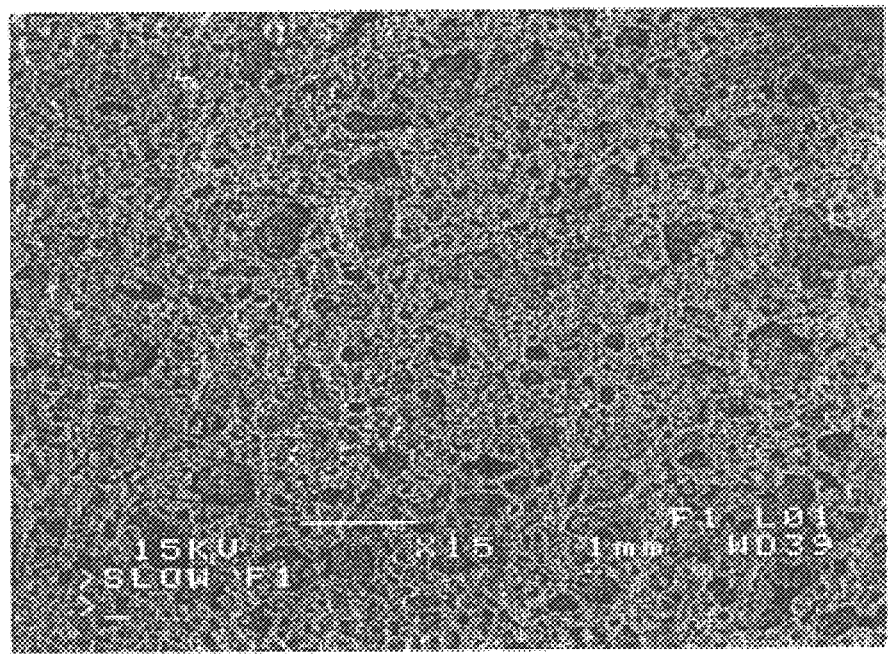
FIG. 5 is a SEM micrograph of a nickel foam structure produced with a thermoplastic binder in accordance with the invention.

FIG. 4 presents a section of a specimen obtained with the formulation of Table 4. The material has maintained its porous structure after sintering. It is highly porous and has three level of porosity. The porosity is interconnected. This porous material has a sintered density of 1.55 g/cm$^3$.

It will be understood by one skilled in the art that numerous modifications can be made without departing from the spirit and scope of the invention as defined in the appended claims.

We claim:

1. A method of making a porous body, comprising the steps of:
   a) providing a dry flowable powder mixture comprising 10–90 wt. % of sinterable inorganic particles, 10–90 wt. % of binder, and 0.25–5 wt. % of foaming agent;
   b) shaping the flowable mixture into a predetermined form;
   c) heating the resulting product to melt said binder while inducing foaming in the mixture;

d) heating the product obtained in c) to pyrolyze said binder; and e) sintering the obtained product to form a solid low-density open-cell foam.

2. A method as claimed in claim 1, wherein said sinterable particles are metal particles in a wt. % of 40–90%.

3. A method as claimed in claim 1, wherein said sinterable particles are ceramic particles in a wt. % of 10–60%.

4. A method as claimed in claim 1, wherein said sinterable particles are coated particles.

5. A method as claimed in claim 1, wherein said sinterable particles are a mixture of metallic, ceramic and/or coated particles.

6. A method as claimed in claim 1, wherein said binder content is between 20 to 70 wt. %.

7. A method as claimed in claim 1, wherein the content of foaming agent is between 0.5 and 3 wt. %.

8. A method as claimed in claim 1, wherein said dry flowable powder mixture further comprises 0.01 wt. % to 5 wt. % of additional binder to minimize segregation and dusting and improve the flowability of the mixture.

9. A method as claimed in claim 1, wherein said flowable mixture is subject to successively increasing temperatures to carry out at least steps b, c, d and e.

10. A method as claimed in claim 9, wherein said temperatures are increased in a stepwise manner.

11. A method as claimed in claim 1, wherein said powder is heated at a temperature between 40° C. to 300° C. to melt said binder.

12. A method as claimed in claim 1, wherein said powder is heated at a temperature between 75° C. to 200° C. to melt said binder.

13. A method as claimed in claim 9, wherein step e is carried out at a temperature ranging from 30% to 90% of the melting temperature of said sinterable material.

14. A method as claimed in claim 11, wherein step e is carried out at a temperature ranging from 45 to 75% of the melting temperature of said sinterable material.

15. A method as claimed in claim 1, wherein said binder is solidified with the aid of a curing agent.

16. A method as claimed in claim 1, wherein said binder is a thermoset resin.

17. A method as claimed in claim 1, wherein said binder is a thermoplastic polymer.

18. A method as claimed in claim 17, wherein said thermoplastic polymer is cured with the aid of a curing agent or by a cross-linking treatment selected from the group consisting of irradiation and light exposure.

19. A method as claimed in claim 1, wherein said shaping step is carried out by a process selected from the group consisting of molding, deposition and lamination.

20. A method as claimed in claim 1, wherein the foaming agent is a solid.

21. A method as claimed in claim 1, wherein the foaming agent is a liquid embedded or in solid solution in the binder.

22. A method as claimed in claim 1, wherein the foaming agent is a gas in solid solution in the binder.

23. A method as claimed in claim 1, wherein the foaming agent is a mixture on two or more foaming agents selected from the group consisting of solid foaming agents, liquid foaming agents embedded or in solution in the binder, and gaseous foaming agents embedded in the binder.

24. A method as claimed in claim 1, wherein pressure is applied to the powder mixture before or during the heating thereof in steps c or d.

25. A method as claimed in claim 1, wherein the organic binder is blended with the other components of said mixture by dry mixing or milling.

26. A method as claimed in claim 1, wherein the organic binder is blended with the other components of said mixture by mixing the binder in suspension or solution in liquid.

27. A method as claimed in claim 26, wherein said liquid is removed by the application of heat or vacuum.

28. A method of making a porous body, comprising the steps of:

a) providing a dry flowable powder mixture comprising 10–90 wt. % of sinterable particles, 10–90 wt. % of binder, and 0.25–5 wt. % of solid foaming agent;

b) shaping the flowable mixture into a predetermined form;

c) heating said product to melt said binder so that it flows around said sinterable particles to close pores in the mixture;

d) inducing foaming in the mixture;

e) heating the product of d) to burn out said binder; and f) sintering the resulting product to form a solid low-density open-cell foam.

29. A method as claimed in claim 28, wherein the powder mixture is subjected to stepwise increasing temperatures to carry out steps b, d, and e.

30. A precursor composition for making sintered porous bodies in the form of a dry flowable powder mixture comprising 10–90 wt. % of sinterable particles, 10–90 wt. % of binder, and 0.25–5 wt. % of foaming agent.

31. A precursor composition as claimed in claim 30, further comprising 0.01 wt. % to 5 wt. % of additional binder to minimize segregation and dusting and improve the flowability of the mixture.

32. A precursor composition as claimed in claim 30, wherein said sinterable particles are metal particles in a wt. % of 40–90%.

33. A precursor composition as claimed in claim 30, wherein said sinterable particles are ceramic particles in a wt. % of 10–60%.

34. A precursor composition as claimed in claim 30, wherein said sinterable particles are coated particles in a wt. % of 10–90%.

35. A precursor composition as claimed in claim 30, wherein said sinterable particles are a mixture of metal, ceramic and/or coated particles in a wt. % of 10–60%.

36. A precursor composition as claimed in claim 30, wherein said binder content is between 20 to 70 wt. %.

37. A precursor composition as claimed in claim 30, wherein the content of foaming agent is between 0.5 and 5 wt. %.

38. A precursor composition as claimed in claim 30, further comprising a lubricant to ease shaping, molding or demolding.

39. A precursor composition as claimed in claim 30, wherein the foaming agent is incorporated in the mixture in a state selected from the group consisting of the solid, liquid or gaseous state.

40. A precursor composition as claimed in claim 30, wherein the mixture comprises flowing agents to improve the flowability of the mixture.

* * * * *